United States Patent
Lindemann

(10) Patent No.: US 8,483,658 B1
(45) Date of Patent: Jul. 9, 2013

(54) METHOD AND ARRANGEMENT FOR REPORTING CREDIT/CHARGING INFORMATION TO A MOBILE COMMUNICATION STATION

(75) Inventor: Klaus Lindemann, Fredriksberg (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/806,300

(22) PCT Filed: Sep. 28, 1999

(86) PCT No.: PCT/FI99/00796
§ 371 (c)(1),
(2), (4) Date: May 17, 2001

(87) PCT Pub. No.: WO00/19700
PCT Pub. Date: Apr. 6, 2000

(30) Foreign Application Priority Data

Sep. 29, 1998 (FI) .......................................... 982098

(51) Int. Cl.
*H04M 11/00* (2006.01)
(52) U.S. Cl.
USPC ........................................................ 455/408
(58) Field of Classification Search
USPC .............. 455/407, 466, 406, 408, 405, 414.1, 455/412.1, 418
See application file for complete search history.

(56) References Cited

U.S. PATENT DOCUMENTS

| | | | |
|---|---|---|---|
| 5,109,401 A | | 4/1992 | Hattori et al. |
| 5,748,720 A | * | 5/1998 | Loder ............................ 455/406 |
| 5,751,798 A | | 5/1998 | Mumick et al. |
| 5,784,442 A | * | 7/1998 | Foti ............................... 455/405 |
| 5,835,856 A | * | 11/1998 | Patel ............................. 455/406 |
| 5,907,802 A | | 5/1999 | Scott |
| 6,044,259 A | * | 3/2000 | Hentila et al. ................ 455/406 |
| 6,070,067 A | * | 5/2000 | Nguyen et al. ................ 455/407 |
| 6,088,431 A | * | 7/2000 | LaDue ........................ 379/114.2 |
| 6,108,531 A | * | 8/2000 | Berg et al. ...................... 455/408 |
| 6,131,024 A | * | 10/2000 | Boltz ............................. 455/405 |
| 6,138,002 A | * | 10/2000 | Alperovich et al. ........... 455/407 |
| 6,195,543 B1 | * | 2/2001 | Granberg ....................... 455/407 |
| 6,198,915 B1 | * | 3/2001 | McGregor et al. ............. 455/406 |
| 6,295,446 B1 | | 9/2001 | Rocha |

(Continued)

FOREIGN PATENT DOCUMENTS

| | | |
|---|---|---|
| EP | 0 647 055 | 4/1995 |
| EP | 0734144 A2 | 9/1996 |

(Continued)

OTHER PUBLICATIONS

Newton's Telecom Dictionary, "completed call", p. 256, 23rd ed., Flatiron Publishing, New York, 2007.
GSM 02.90 V8.0.0 (Mar. 1999); Digital cellular telecommunications system (Phase 2+); Unstructured Supplementary Service Data (USSD)—Stage 1(GSM 02.90 version 8.0.0 Release 1999) Available SMG only (11 pages).

(Continued)

*Primary Examiner* — Blane J Jackson
(74) *Attorney, Agent, or Firm* — Harrington & Smith

(57) ABSTRACT

A method for transmitting prepaid charging/credit information to a mobile station. The available credit information can be sent to the mobile station by detecting a termination of a call chargeable to the subscriber of the mobile station; and in response to the detecting, sending the credit information to the mobile station as a connectionless message, preferably as a short message or a USSD message. Optionally, resources allocated to the call are released with sufficient delay for sending the connectionless message without paging the mobile station separately.

19 Claims, 2 Drawing Sheets

U.S. PATENT DOCUMENTS

| | | | |
|---|---|---|---|
| 6,430,406 B1 * | 8/2002 | Frisk | 455/407 |
| 6,434,126 B1 | 8/2002 | Park | |
| 6,473,612 B1 | 10/2002 | Cox et al. | |
| 6,480,710 B1 * | 11/2002 | Laybourn et al. | 455/406 |
| 6,493,547 B1 * | 12/2002 | Raith | 455/405 |

FOREIGN PATENT DOCUMENTS

| | | |
|---|---|---|
| EP | 0 778 690 | 6/1997 |
| EP | 0 813 332 | 12/1997 |
| EP | 0 920 178 A2 | 6/1999 |
| WO | WO 93/2064 | 10/1993 |
| WO | WO-93/20644 A1 | 10/1993 |
| WO | WO-96/42175 A1 | 12/1996 |
| WO | WO 97/42772 | 11/1997 |
| WO | WO 97/49226 | 12/1997 |

OTHER PUBLICATIONS

GSM Technical Specification, GSM 02.93, Dec. 1996, Version 5.2.0; Digital cellular telecommunications system (Phase 2+); Completion of Calls to Busy Subscriber (CCBS) Service description, Stage 1 (GSM 02.93) (22 pages).

ETSI TS 100 549 V7.0.0 (Aug. 1999) Digital cellular telecommunications system (Phase 2+); Unstructured Supplementary Service Data (USSD)—Stage 2 (GSM 03.90 version 7.0.0 Release 1998) (33 pages).

ETSI EN 300 957 V7.0.1 (Jan. 2000) Digital cellular telecommunications system (Phase 2+); Unstructured Supplementary Service Data (USSD); Stage 3 (GSM 04.90 version 7.0.1 Release 1998) (14 pages).

* cited by examiner

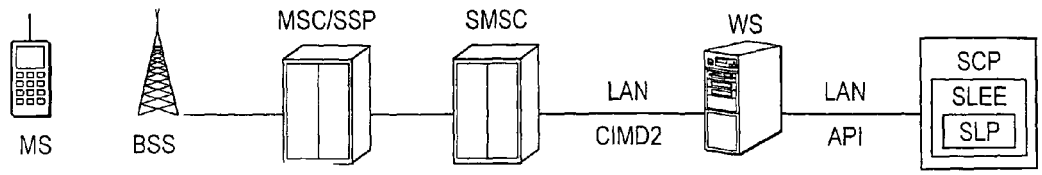
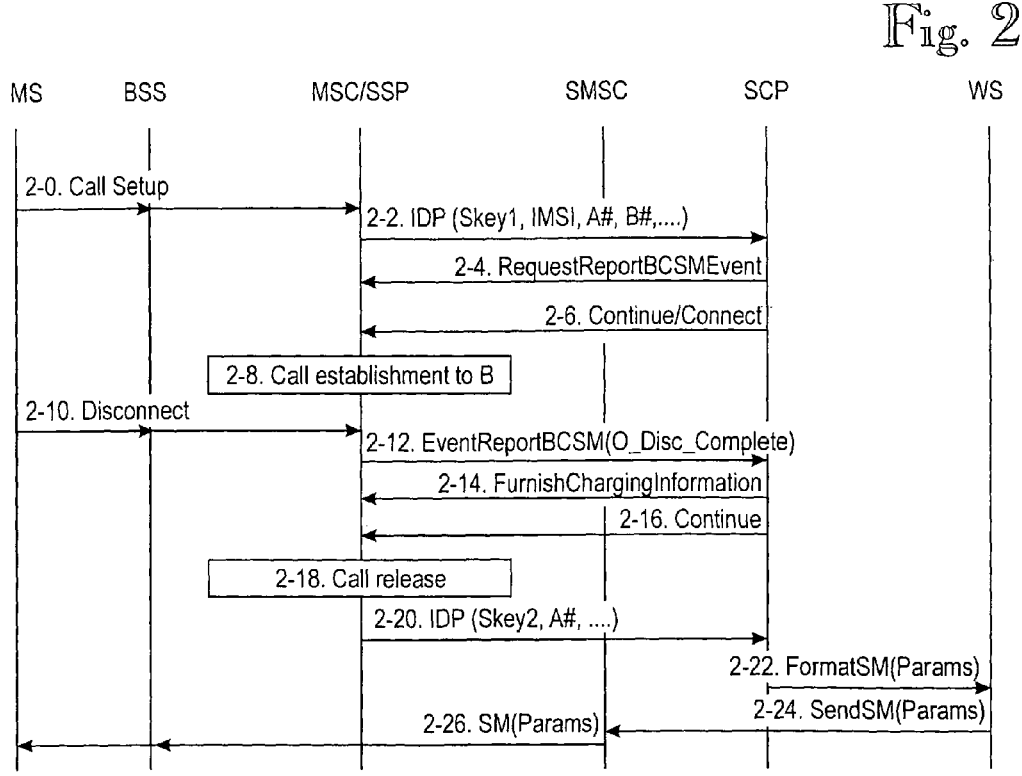
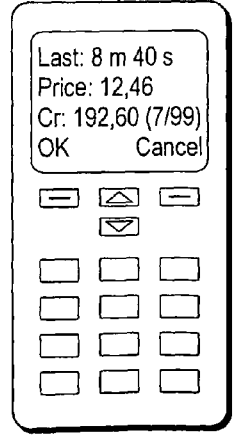

METHOD AND ARRANGEMENT FOR REPORTING CREDIT/CHARGING INFORMATION TO A MOBILE COMMUNICATION STATION

This application is the National Phase of International Application PCT/FI99/00796 filed Sep. 28, 1999 which designated the U.S. and that International Application was published under PCT Article 21(2) in English.

BACKGROUND OF THE INVENTION

The invention relates to methods and equipment for reporting charging information to mobile subscribers, including, for example reporting the amount of available credit to prepaid subscribers. In mobile communications systems, such as GSM, the use of prepaid SIM (Subscriber Identity Module) cards is increasing. Prepaid SIM cards relieve the network operators of credit losses. They enable parents to set an upper limit for the telephone bill of their children beforehand. As a third benefit, they enable roaming subscribers to pay their local calls with local tariffs, whereas the use of the SIM card of their home operator results in paying international tariffs to their home network and back.

A problem with prepaid SIM cards is that current mobile stations (handsets) are not provided with means for automatically displaying credit-related information, such as the current credit status, immediately after the end of a call. Some operators allow the subscribers to call an Interactive Voice Response (IVR) service which reports the available credit by synthesized speech. Such a service causes another problem: using the IVR causes a significant amount of overhead traffic in the radio interface. This non-chargeable traffic consumes resources which could be better spent on chargeable calls.

DISCLOSURE OF THE INVENTION

An object of the invention is to provide a mechanism for reporting the available credit status for prepaid subscribers in a way which allows reducing the overhead traffic load in the radio interface. To discourage users from calling the IVR, the mechanism according to the invention must be fast enough, so that the users will not experience annoying delays. These objects are achieved with a method and equipment which are characterized by what is disclosed in the attached independent claims. Preferred embodiments of the invention are disclosed in the attached dependent claims.

According to one embodiment, at call termination, a service logic program (SLP) handling the call in a Service Control Point (SCP) sends the credit information (e.g. via a LAN connection) to a program running on a separate processor or workstation WS. This program then reformats and passes on the information (e.g. via another LAN) to the Short Message Service Center (SMSC), which sends the actual short message to the mobile station. The LAN connections can be standard TCP/IP connections. The protocol between the SCP and the workstation can be a specific protocol which is used via an Applications Programming Interface (API). The protocol used between the WS and e.g. Nokia's SMSC is called Computer Interface to Message Distribution-2 (CIMD-2). The program running on the workstation is typically written in C++. To use the API, the programmer has to insert statements in the Service Logic Program (SLP) and write a separate C++ program for receiving the information. CIMD-2 is a simple character based protocol, where a client process makes requests to the server and the server responds.

The basic idea behind the solution is to utilise both the above-mentioned interfaces to make a direct connection from the SCP to the SMSC, thus reducing the time delay from the termination of the call to the time the information is sent as an SMS. This short time is the main advantage of this solution, and experiments performed by the inventor in a test platform have shown that the mobile station can receive the short message in 1 to 5 seconds from the termination of the call.

Optionally, releasing the call will be delayed whereby the message according to the invention can be delivered without a separate page message.

Preferably, the information is extracted from the SCP, because no problems due to propagation delay arise. The SLPs (Service Logic Programs handling the calls) being executed on the SCP provide functionality for communicating with an external process through a gateway between services running inside the Service Logic Execution Environment (SLEE) and external applications. More specifically, the SLPs can send messages to an external process via a socket. The external process runs on a separate computer or workstation, and therefore it does not influence the performance of the SCP. The SLP handling a prepaid call runs during the whole call, since it controls credit updating. This means it will know when the call has finished. The information needed by the external process could then be sent out by adding some SLP code at the end of the prepaid SLP.

Yet another solution is to use the SS7 network for sending the information between the SCP and the SMSC. This solution apparently requires the use of the MAP protocol. As an advantage, no new elements (network connections, programs) would be introduced.

BRIEF DESCRIPTION OF THE DRAWINGS

The invention will be described in more detail by means of preferred embodiments with reference to the appended drawing wherein:

FIG. 1 is a block diagram of a mobile communications network equipped with an arrangement according to a preferred embodiment of the invention;

FIG. 2 is a signalling diagram illustrating one embodiment of the invention; and FIG. 3 depicts a mobile station after receiving and displaying a short message according to the invention.

DETAILED DESCRIPTION OF THE INVENTION

Figure 4:
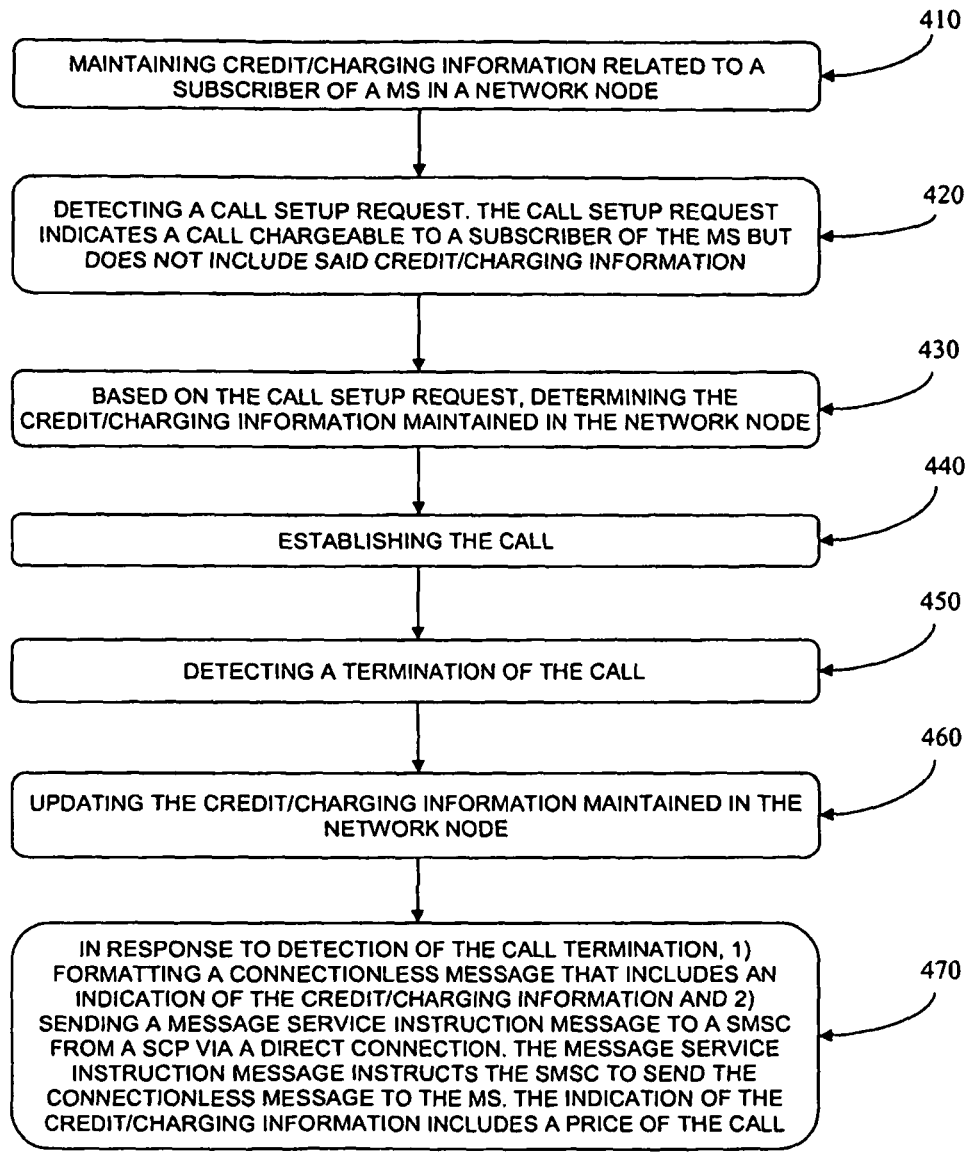
FIG. 4 is a logic flow diagram that illustrates the operation of an exemplary method, in accordance with various exemplary embodiments.

FIG. 1 is a block diagram of a mobile communications network equipped with an arrangement according to a preferred embodiment of the invention. This embodiment makes use of Intelligent Network technology. An intelligent network (IN) is able to provide a subscriber of a telecommunications network, such as a wired network or a mobile telephone network, with a plurality of various services. Such services include a virtual private network (VPN) which allows the use of short numbers between subscribers belonging to a local network, and a personal number in which the intelligent network reroutes the calls directed to a personal number in a manner controlled by the subscriber. An example of such an intelligent network is described in recommendations of the ITU-T Q-1200 series, of which Q-1210 to Q-1219 define a set of features known as CS-1 (Capability Set 1), and correspondingly, Q-1220 to Q-1229 define a set of features CS-2. The invention and its background will be described by the terminology of recommendation ETS 300 374-1 CoreINAP, but the invention can also be employed in intelligent networks implemented according to other intelligent network standards.

A basic call state model (BCSM), defined in connection with the intelligent network, describes different stages of call control and defines the points in which call control can be interrupted in order to start an intelligent network service. It identifies the detection points in the call and connection process in which service logic entities of the intelligent network can have an interactive relationship with basic call and connection management features.

In conventional call set-up which takes place without the help of an intelligent network, telephone exchanges make independently all the deductions about call routing. One or more service control functions (SCF) are associated with intelligent network architecture. The equipment or network element carrying out the tasks determined for the SCF is called a service control point (SCP). In the present invention, the SCF and the SCP are equal, and will hereinafter be called the SCP. The SCP gives call set-up instructions to the exchange, or the exchange may inquire call set-up instructions from the SCP. If the interface of subscriber B is found to be busy at some stage of call set-up, for example, the call can be directed to an alternative number. Service data function SDF and service data point SDP form a database comprising subscriber-specific and/or service-specific information.

A service switching function (SSF) is an interface between the call control function CCF and the service control function SCF. The network element performing the SSF is called a service switching point (SSP). An intelligent network service is produced by the service switching point SSP inquiring instructions from the service control point SCP by means of messages to be transmitted across the SSP/SCP interface upon the encounter of detection points associated with the services. In intelligent network terminology these messages are called operations. In association with an intelligent network service, a service program is started at the service control point SCP, the operation of the program determining the operations transmitted by the SCP to the SSP at each stage of a call.

FIG. 2 is a signalling diagram illustrating a preferred embodiment of the invention. The scenario shown in FIG. 2 begins in step 2-0 wherein the MS sends CALL SETUP signalling to the MSC. In this example, it will be assumed that call establishment takes place under IN control, but this is not necessary to the invention. Another assumption, made here, is that the IN is also responsible for keeping track of the available credit of the prepaid SIM card. In step 2-2, the MSC sends the SCP an INITIAL DETECTION POINT (IDP) message, the parameters of which comprise a Service key Skey1 and the calling and called party numbers A# and B#. Service key Skey1 identifies the IN service in question. In step 2-4, the SCP sends the MSC a REQUESTREPORTBCSMEVENT message, indicating which detection points the MSC must report to the SCP. One such interesting detection point is the one that concerns termination of calls. In step 2-6, the SCP sends the MSC a CONTINUE message which directs the MSC to route the call normally. (Alternatively, the SCP might send a CONNECT message indicating an alternative number, but such variations are irrelevant to understanding the actual invention.) Step 2-8 comprises all the necessary steps for call establishment to the called party B. For clarity, such routine steps are not shown separately. In step 2-10, the MS terminates the call by sending a DISCONNECT message. In step 2-12, the MSC sends the SCP an EVENTREPORTBCSM message indicating disconnection from the originating side. In step 2-14 the SCP returns a FURNISHCHARGINGINFORMATION message to the MSC. In response to the CONTINUE message in step 2-16, the MSC releases the resources allocated to the call in step 2-18. Again, such routine steps are not shown separately.

According to one embodiment of the invention, in step 2-20, the MSC sends the SCP a second IDP message, having as its parameters a second Service key (Skey2) and the calling party number A#. Service key Skey2 identifies the supplementary service which indicates the available credit to the prepaid subscriber. The next two steps make use of a separate workstation WS, although these steps could also be implemented by means of a process being executed in the SCP. Next, in step 2-22, the SCP sends the WS a message requesting the WS to format a short message indicating the credit information. Preferably, the credit information comprises the duration and price of the last call, and the amount and lifetime of available credit. In step 2-24 the WS sends this information to the Short Message Service Center SMSC, which, in step 2-26 sends it to the MS in a suitably formatted short message.

FIG. 3 shows a mobile station MS after it has received and displayed the short message of step 2-24. In a bilingual or multilingual country like Finland or Switzerland, the workstation SW might make use of the subscriber's language (stored in the HLR) and format the message accordingly.

Based on the above example, several variations will be obvious to a skilled reader. For example, it was assumed that the SCP takes care of both call processing and keeping track of the available credit of the prepaid SIM card, and that the SCP stores the available credit to an IN database called Service Data Point (SDP, not shown separately). This is why the available credit did not have to be transferred to the SCP at the beginning of the call. Of course, keeping track of the available credit can take place in the MSC, whereby the IN call control (steps 2-2 to 2-6 and 2-12 to 2-16) is unnecessary. Alternatively, the SCP could perform call control but the MSC might keep track of the prepaid credit. In this case, only step 2-14 is unnecessary.

As a yet further alternative, the IN call control and the credit reporting according to the invention could be integrated so that sending the CONTINUE message to the MSC in step 2-16 would also trigger sending the FORMATSHORTMESSAGE message to the WS in step 2-22. In other words, the message in step 2-20 is unnecessary. However, for reasons of compatibility with different implementation options, in the example shown in FIG. 2, the SCP reports the credit information to the MSC in step 2-14, and the MSC returns the credit information back to the SCP in step 2-20. In this way, the credit reporting service according to the invention (steps 2-20 to 2-26) is compatible with all combinations of call control and credit tracking under the MSC or the SCP.

Although sending the credit information as a short message is considered the best mode, other transmission channels could be used. A possible alternative transmission method is the use of USSD (Unstructured Supplementary Service Data), which is defined in references 2 to 4. However, network-initiated USSD is only possible with Phase-2 mobile stations. Short message transmission and USSD transmission can be commonly referred to as connectionless transmissions because the information is simply transmitted to the recipient, without the establishment of an end-to-end connection.

The invention can be used for transmitting any kind of credit/charging information the transmission of which is triggered in response to ending a call. Preferably, the credit/charging information comprises the current credit status, the duration of the last call, the price of the last call and the validity period of the SIM card. Although the invention has been described in connection with prepaid subscriptions, it is not a strict requirement that the subscription is prepaid. As an alternative, subscribers may wish to set an upper limit for the monthly telephone bill. Thus, even if a mobile telephone is stolen, the amount of damage could be restricted to the predefined upper limit, and parents can set an upper limit to the monthly telephone bill of their children. The invention is equally suitable for transmitting the available charging limit (the predefined upper limit minus the accumulated, but not yet invoiced, charge).

FIG. 4 is a logic flow diagram that illustrates the operation of a method, in accordance with various exemplary embodiments. In accordance with these exemplary embodiments the method performs, at Block 410, a step of maintaining credit/charging information related to a subscriber of a mobile station in a network node. At Block 420, the method performs a step of detecting a call setup request. The call setup request indicates a call chargeable to a subscriber of the mobile station but does not include said credit/charging information Based on the call setup request, the method performs, at Block 430, a step of determining the credit/charging information maintained in the network node. The method performs, at Block 440, a step of establishing the call and at Block 450, a step of detecting a termination of the call. A step of updating the credit/charging information maintained in the network node is performed at Block 460. In response to detection of the call termination, the method also performs, at Block 470, a step of 1) formatting a connectionless message that includes an indication of the credit/charging information and 2) sending a message service instruction message to a short message service center from a service control point via a direct connection. The message service instruction message instructs the short message service center to send the connectionless message to the mobile station. The indication of the credit/charging information includes a price of the call.

REFERENCES

1. GSM 02.90: European digital cellular telecommunications system (Phase 2); Stage 1 description of Unstructured Supplementary Service Data (USSD)
2. GSM 03.90: Digital cellular telecommunications system (Phase 2); Unstructured Supplementary Service Data (USSD)—Stage 2
3. GSM 04.90: European digital cellular telecommunications system (Phase 2); Unstructured Supplementary Service Data (USSD)—Stage 3

All references are incorporated herein by reference.

The invention claimed is:

1. A method comprising:
   maintaining credit/charging information related to a subscriber of a mobile station in a network node;
   detecting a call setup request, wherein the call setup request indicates a call chargeable to a subscriber of the mobile station but does not include said credit/charging information;
   based on the call setup request, determining the credit/charging information maintained in the network node;
   establishing the call;
   detecting a termination of the call;
   updating the credit/charging information maintained in the network node; and
   in response to detection of the call termination, formatting a connectionless message comprising an indication of the credit/charging information and sending a message service instruction message to a short message service center from a service control point via a direct connection, the message service instruction message instructing the short message service center to send the connectionless message to the mobile station,
   where the indication of the credit/charging information comprises a price of the call.

2. The method of claim 1, further comprising:
   defining an upper limit for an accumulated price of telephone calls;
   monitoring the accumulated price of telephone calls; and
   allowing a new call only if the accumulated price of telephone calls is less than the upper limit.

3. The method of claim 1, wherein the connectionless message is a short message.

4. The method of claim 1, wherein the connectionless message is an Unstructured Supplementary Service Data message.

5. The method of claim 1, further comprising, releasing the call with sufficient delay to allow sending the connectionless message without paging the mobile station separately after detecting the termination of the call.

6. The method of claim 1, further comprising:
   requesting a Mobile Services Switching Centre to report the termination of the call from an Intelligent Network node;
   reporting the termination of the call from the Mobile Services Switching Centre; and
   determining and sending the credit/charging information to the mobile station.

7. The method of claim 1, where the indication of the credit/charging information further comprises a lifetime of available credit.

8. The method of claim 1, where the indication of the credit/charging information further comprises a duration of the call.

9. A method according to claim 1, wherein the credit/charging information is automatically displayed on a display of the mobile station.

10. The method of claim 1, where formatting the connectionless message comprises formatting the connectionless message according to a stored subscriber's language.

11. A method comprising:
    maintaining credit/charging information related to a subscriber of a mobile station in a network node;
    detecting a call setup request, wherein the call setup request indicates a call chargeable to a subscriber of the mobile station but does not include said credit/charging information;
    based on the call setup request, determining the credit/charging information maintained in the network node;
    establishing the call;
    detecting a termination of the call;
    updating the credit/charging information maintained in the network node; and
    in response to detection of the call termination, formatting a connectionless message comprising an indication of the credit/charging information and sending the connectionless message to the mobile station,
    where the indication of the credit/charging information comprises a price of the call,
    the method further comprising:
    executing a Service Logic Program in a Service Logic Execution Environment to send the credit/charging information at a Service Control Point; and
    communicating with an external process through a gateway between services running inside the Service Logic Execution Environment and an external application, wherein the credit/charging information is sent using the gateway to the external application and subsequently to the mobile station.

12. An apparatus configured to:

maintain credit/charging information related to a subscriber of a mobile station in a network node;

detect a call setup request, wherein the call setup request indicates a call chargeable to the subscriber of the mobile station but does not include said credit/charging information;

based on the call setup request, determine the credit/charging information maintained in the network node;

establish the call;

detect a termination of the call; and in response to said detection, format a connectionless message comprising an indication of the credit/charging information and send a message service instruction message to a short message service center from a service control point via a direct connection, the message service instruction message instructing the short message service center to send said credit/charging information to the mobile station as a connectionless message, where the indication of the credit/charging information comprises a price of the call.

13. The apparatus of claim 12, comprising a Service Control Point of an Intelligent Network, the Service Control Point including a Service Logic Program configured to send the credit/charging information in response to detection of the call termination.

14. The apparatus of claim 13, further comprising a separate processor configured to format the credit/charging information.

15. The apparatus of claim 12, where the indication of the credit/charging information further comprises a lifetime of available credit.

16. The apparatus of claim 12, where the apparatus is further configured to:

define an upper limit for an accumulated price of telephone calls;

monitor the accumulated price of telephone calls; and allow a new call only if the accumulated price of telephone calls is less than the upper limit.

17. The apparatus of claim 12, where the apparatus is further configured to release the call with sufficient delay to allow sending the connectionless message without paging the mobile station separately after detecting the termination of the call.

18. The apparatus of claim 12, where the indication of the credit/charging information further comprises a duration of the call.

19. The apparatus of claim 12, where formatting the connectionless message comprises formatting the connectionless message according to a stored subscriber's language.

* * * * *